United States Patent [19]
Stoneham et al.

[11] Patent Number: 5,274,412
[45] Date of Patent: Dec. 28, 1993

[54] FILM CASSETTE WITH FRANGIBLE SPOOL LOCK AND CAM

[75] Inventors: Jeffrey R. Stoneham, Spencerport; Joel S. Lawther, Rochester, both of N.Y.

[73] Assignee: Eastman Kodak Company, Rochester, N.Y.

[21] Appl. No.: 909,472

[22] Filed: Jul. 6, 1992

[51] Int. Cl.$^5$ .............................................. G03B 17/26
[52] U.S. Cl. ................................................... 354/275
[58] Field of Search ........................................ 354/275

[56] References Cited

U.S. PATENT DOCUMENTS

| | | | |
|---|---|---|---|
| 4,682,870 | 7/1987 | Atkinson | 354/275 |
| 4,987,437 | 1/1991 | Pagano et al. | 354/275 |
| 4,994,828 | 2/1991 | Smart | 354/21 |
| 4,994,833 | 2/1991 | Cocca | 354/207 |
| 4,998,123 | 3/1991 | Smart | 354/275 |
| 5,032,854 | 7/1991 | Smart et al. | 354/21 |
| 5,032,861 | 7/1991 | Pagano | 354/275 |
| 5,032,862 | 7/1991 | Behnke | 354/275 |
| 5,047,794 | 9/1991 | Pagano et al. | 354/275 |

Primary Examiner—Michael L. Gellner
Assistant Examiner—Nicholas J. Tuccillo
Attorney, Agent, or Firm—Roger A. Fields

[57] ABSTRACT

A film cassette has frangible means that initially operates as a spool lock and as a cam for moving a blocking device in a camera out of the way of the cassette when the cassette is first loaded into the camera but which when broken by a fracturing device in the camera is rendered inoperative as a spool lock and as a cam.

7 Claims, 3 Drawing Sheets

FILM CASSETTE WITH FRANGIBLE SPOOL LOCK AND CAM

CROSS-REFERENCE TO RELATED APPLICATIONS

Reference is made to commonly assigned copending applications Ser. No. 07/909,348, entitled CASSETTE LOAD PREVENTION APPARATUS and filed Jul. 6, 1992 in the names of Jeffrey R. Stoneham and Joel S. Lawther, and Ser. No. 880783 entitled FILM CASSETTE AND ASSOCIATE CAMERA DEVICE and filed May 11, 1992 in the names of Daniel M. Pagano and Stephen H. Miller.

BACKGROUND OF THE INVENTION

1. Field of the Invention

The invention related generally to the field of photography, and in particular to film cassettes. More specifically, the invention relates to a film cassette having frangible means that initially operates as a spool lock and as a cam for ;moving a blocking device in a camera out of the way of the cassette when the cassette is first loaded into the camera but which when broken by a fracturing device in the camera is rendered inoperative as a spool lock and as a cam.

2. Description of the Prior Art

Commonly assigned U.S. Pat. No. 5,047,794, issued Sep. 10, 1991 and U.S. Pat. No. 5,032,861, issued Jul. 16, 1991, each disclose a film cassette having an internal spool lock that is moved by a cam pin in the loading chamber of a camera from a locking position to a non-locking position as the cassette is inserted into the loading chamber and that is moved by a leaf spring in the loading chamber from the non-locking position to the locking position as the cassette is withdrawn from the loading chamber. Also, the cassette has cam formed on its housing for moving a blocking device in the loading chamber out of the way of the cassette as the cassette is inserted into the loading chamber. However, when a film exposure status indicator of the cassette is in a film exposed (used) position, the status indicator covers the cam. Consequently, the blocking device will engage the cassette to prevent the cassette from being inserted into the loading chamber.

Prior art U.S. Pat. No. 3,784,001, issued Jan. 8, 1974, discloses a film cassette in which there is a frangible connection between a film spool and an internal wall of the cassette. The frangible connection has sufficient strength to prevent the spool from rotating during handling of the cassette prior to use but which will break when a filmstrip wound on the spool is first pulled off the spool. Since the frangible connection is located inside the cassette, there is no visible way of knowing when it is broken.

Prior art U.S. Pat. No. 4,683,870, issued Jul. 28, 1987, discloses a film cassette in which a film spool has a coaxial opening containing a frangible piece. When the cassette is loaded into a camera, a shaft is received in the coaxial opening to fracture the frangible piece to provide a visible indication the cassette is used.

The Cross-referenced Applications

Cross-referenced application Ser. No. 880783 relates to a film cassette having a frangible label for preventing rotation of a film spool and to a camera device that breaks the label to permit rotation of the spool.

Cross-referenced application Ser. No. 07/909,348 relates to load prevention apparatus for use with the film cassette disclosed in this application.

SUMMARY OF THE INVENTION

According to the invention, there is provided an improved film cassette wherein lock-out means is arranged for engagement with a blocking device in a camera to prevent insertion of the cassette completely into the camera, and wherein the improvement comprises:

a covering piece fixed over the lock-out means for preventing engagement of the lock-out means with a blocking device in a camera to allow insertion of the cassette completely into the camera but which is readily frangible to permit it to be broken to uncover the lock-out means to allow engagement of the lock-out means with the blocking device to prevent insertion of the cassette completely into the camera.

Moreover, there is provided a rotatable film spool located inside a housing, and the covering piece has integral arresting means normally interconnecting the spool and the housing for preventing rotation of the spool but which is adapted to no longer interconnect the spool and the housing to allow rotation of the spool when the covering piece is broken to uncover the lock-out means.

DETAILED DESCRIPTION OF THE PREFERRED EMBODIMENT

The invention is disclosed as being embodied preferably in a 35 mm film cassette and a corresponding camera. Because such a cassette and camera are well known, this description is directed only to those elements forming part of or cooperating directly with the invention. It is to be understood, however, that any elements not shown or described may take various forms known to persons having ordinary skill in the art.

Figure 1:
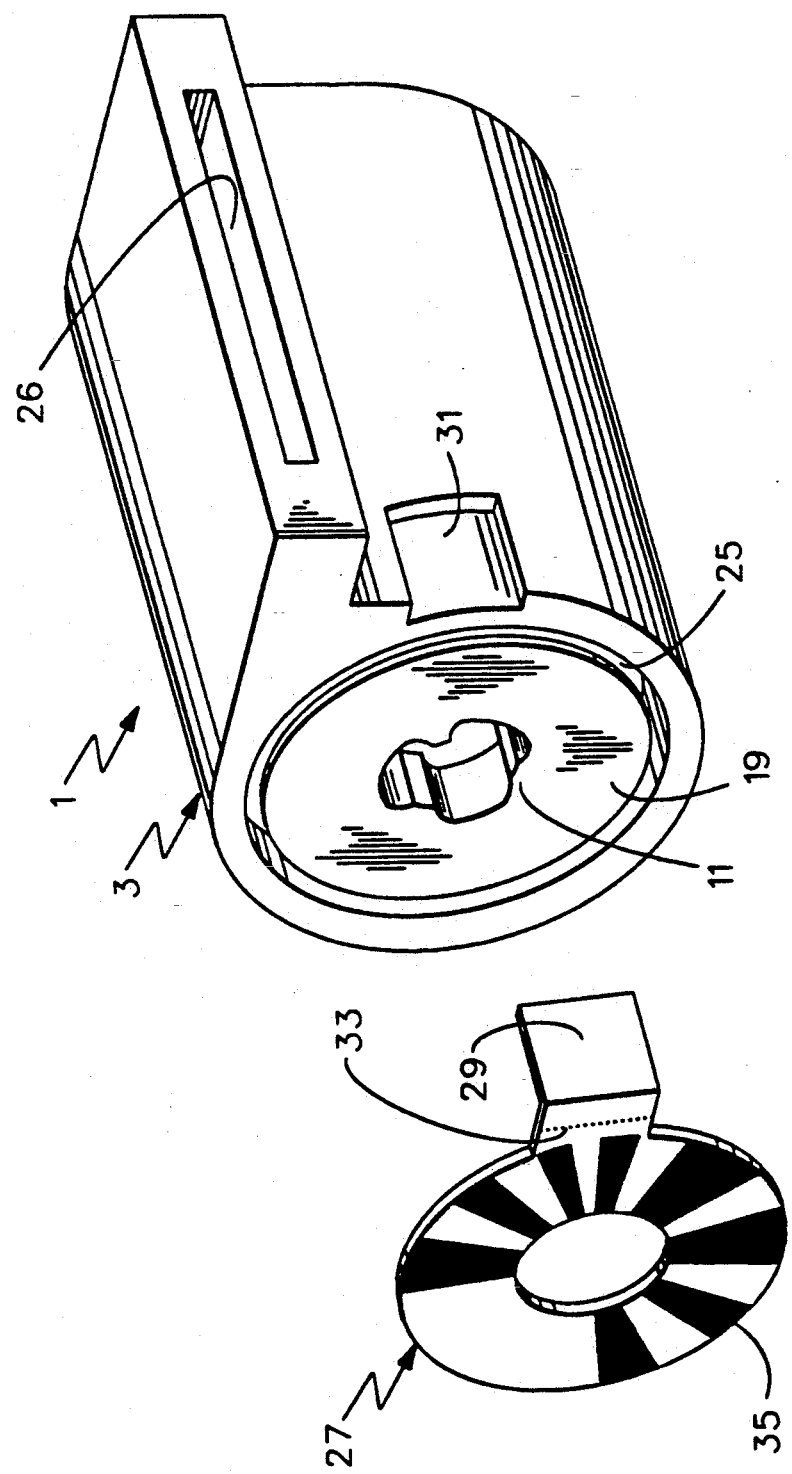
FIG. 1 is a partially exploded perspective view of a film cassette according to a preferred embodiment of the invention.
Figure 2:
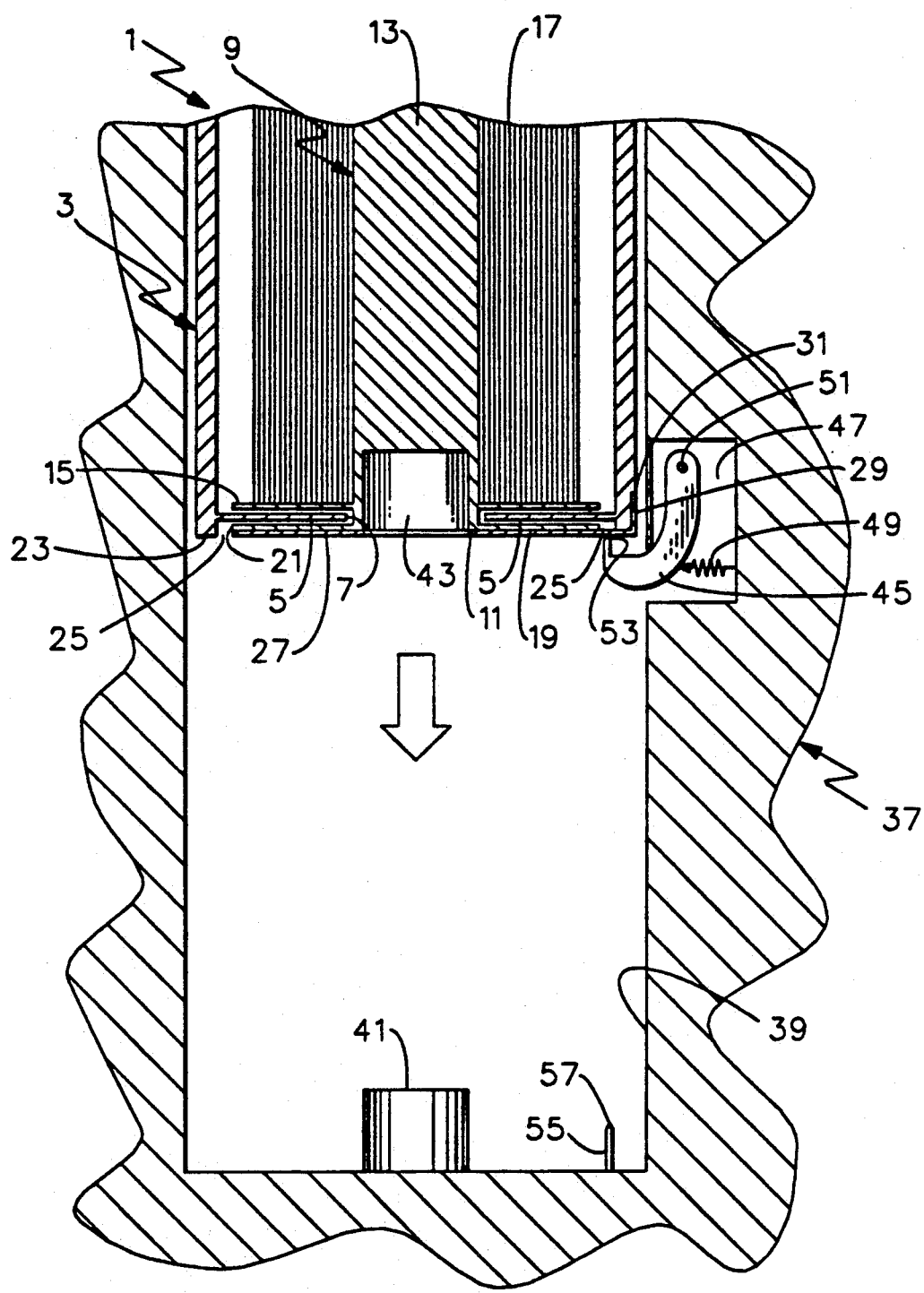
FIGS. 2 and 3 are sectional views of the film cassette and load prevention apparatus for use with the cassette in a camera, for example, depicting various modes of operation of the load prevention apparatus.

Referring now to FIGS. 1 and 2 of the drawings, a 35 mm film cassette 1 comprises a lighttight housing or shell 3 having an end face 5 with a central end opening 7, and a rotatable film spool 9 supported inside the housing with one end 11 protruding through the end opening to outside the housing. The film spool 9 includes a spool core 13, a pair of film flanges 15 (only one shown) coaxially spaced apart on the spool core inside the housing to permit a filmstrip 17 to be wound onto the spool core between the flanges, and an end flange 19 located at the one end 11 of the spool core protruding outside the housing. A circumferential (peripheral) edge 21 of the end flange 19 is spaced from an annular end rib 23 of the housing 3 to leave a trap-like gap, void or cavity 25 between the circumferential edge and the end rib. The housing 3 has a film egress/ingress slot 26. Appropriate means (not shown) such as disclosed in commonly assigned U.S. Pat. No. 5,032,861, issued Jul. 16, 1991, is provided for propelling the filmstrip 17 from inside the housing 3 to outside the housing.

A covering label 27 made of paper or very thin plastic to be readily frangible is affixed by glueing to the end flange 19 as shown in FIGS. 1 and 2, and includes an integral tab-like extension 29 which is affixed by glueing to the housing 3 within a recess 31 in the housing. The covering label 27 with the addition of its tab-like extension 29 serves normally to interconnect the film spool 9 and the housing 3 to prevent rotation of the film spool relative to the housing. The tab-like extension 29 has a perforated line of weakness 33 longitudinally extending over the trap-like gap 25 to facilitate breaking or tearing the tab-like extension in order to permit the film spool 9 to rotate. The covering label 27 has a radial bar code 35 similar to the bar code disclosed in commonly assigned U.S. Pat. No. 5,032,854, issued Jul. 16, 1991.

Figure 3:
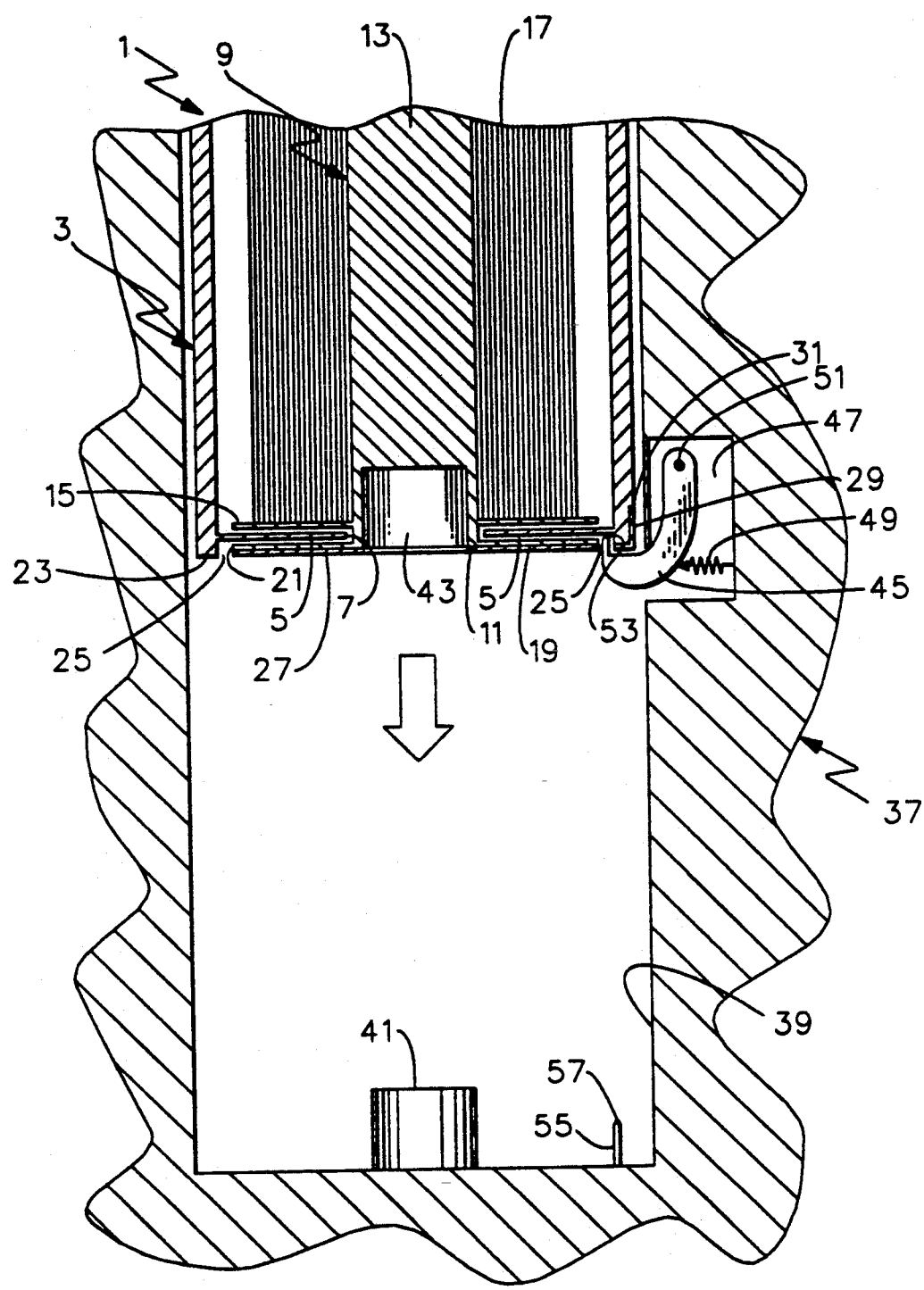

Load prevention apparatus 37 to be used with the film cassette 1 is shown in FIGS. 2 and 3. The load prevention apparatus 37 includes a loading chamber 39 configured to receive the film cassette 1 endwise. A spindle 41 projects from the bottom of the loading chamber 39 for receipt in a coaxial cavity 43 in the spool core 13 to engage and rotatably support the spool core, when the film cassette 1 is inserted completely into the chamber. A blocking lever 45 located within a nest 47 opening to the loading chamber 39 is urged by a compression spring 49 to pivot clockwise in FIG. 2 about a support pin 51 until a hook-like end 53 of the blocking lever protrudes into the loading chamber. In this normal position, the blocking lever 45 is disposed to locate its hook-like end 53 for contact with the particular portion of the tab-like extension 29 of the covering label 27 that lies over the trap-like gap 25, when the film cassette 1 is first inserted into the loading chamber 39. Consequently, the particular portion of the tab-like extension 29 of the covering label 27 that lies over the trap-like gap 25 will cam or pivot the blocking lever 45 counter-clockwise in FIG. 2 to a retracted position (not shown) out of the way of the film cassette 1 to allow the cassette to be further inserted into the loading chamber 39. However, should the particular portion of the tab-like extension 29 that lies over the trap-like gap 25 be torn or broken open along its perforated line of weakness 33 to thereby uncover the trap-like gap, the hook-like end 53 of the blocking lever 45 (in its normal position) will be received in the trap-like gap to snag or engage the housing 3 at its end rib 23 to prevent further insertion of the film cassette 1 into the loading chamber 39. See FIG. 3.

A fracturing piece 55 having a label-cutting end 57 aligned with the hook-like end 53 of the blocking lever 45, when the blocking lever is in its normal position shown in FIG. 2, projects from the bottom of the loading chamber 39. The cutting end 57 is arranged to tear or break open the particular portion of the tab-like extension 29 of the covering label 27 that lies over the trap-like gap 25, along the perforated line of weakness 33, when the spool core 33 is seated on the spindle 41. Consequently, the film spool 9 is thus made free to rotate and, of course, the blocking lever 45 will prevent insertion of the film cassette 1 into the loading chamber 39 a second time.

The invention has been described with reference to a preferred embodiment. However, it will be appreciated that various modifications can be effected within the ordinary skill in the art without departing from the scope of the invention.

We claim:

1. An improved film cassette wherein lock-out means is arranged for engagement with a blocking device in a camera to prevent insertion of said cassette completely into the camera, and wherein the improvement comprises:

a covering piece fixed over said lock-out means for preventing engagement of the lock-out means with a blocking device in a camera to allow insertion of said cassette completely into the camera but which is readily frangible to permit it to be broken to uncover the lock-out means to allow engagement of the lock-out means with the blocking device to prevent insertion of the cassette completely into the camera.

2. The improvement as recited in claim 1, wherein a rotatable film spool is located inside a housing, and said covering piece has integral arresting means normally interconnecting said spool and said housing for preventing rotation of the spool but which is adapted to no longer interconnect the spool and the housing to allow rotation of the spool when the covering piece is broken to uncover said lock-out means.

3. The improvement as recited in claim 2, wherein said housing has an end opening, said spool has one end protruding through said end opening to the outside of said housing, said lock-out means includes an end rib of said housing located opposite said one end of the spool to leave a gap between said end rib and the one end which is adapted to receive the blocking device in the camera to prevent insertion of said cassette completely into the camera, and said covering piece includes a covering label fixed over said gap to prevent the blocking device from being received in the gap and to interconnect said one end of the spool and said housing to prevent rotation of the spool but which can be broken to uncover the gap and disconnect the one end of the spool and the housing.

4. The improvement as recited in claim 1, wherein said lock-out means includes exterior means defining a void for receiving the blocking device in the camera to prevent insertion of said cassette completely into the camera, and said covering piece includes a covering label fixed over said void to prevent the blocking device from being received in the void and to provide a visible indication said cassette is unused but which can be broken to uncover the void and provide a visible indication said cassette is used.

5. An improved film cassette wherein a rotatable film spool is located inside a housing, and wherein the improvement comprises:

a single, readily frangible piece attached to said spool and said housing to prevent rotation of the spool and arranged at the outside of the housing to move a blocking device in a camera out of the way of the housing as said cassette is inserted into the camera but which when broken is rendered inoperative to prevent rotation of the spool and to move the blocking device out of the way of the housing.

6. An improved film cassette wherein a housing has an end opening, a rotatable film spool is located inside said housing and has one end protruding through said end opening to the outside of the housing, and wherein the improvement comprises:

an end rib of said housing located opposite said one end of the spool to leave a gap between said end rib and the one end of the spool which is adapted to receive a blocking device in the camera to prevent insertion of said cassette completely into the camera; and an exterior, readily frangible, covering label fixed over said gap to prevent the blocking device from being received in the gap and interconnecting said one end of the spool and said housing to prevent rotation of the spool but which when can be broken to uncover the gap and no longer interconnect the one end of the spool and the housing.

7. The improvement as recited in claim 6, wherein said covering label includes a line of weakness longitudinally extending over said gap.

* * * * *